Patented July 16, 1935

2,008,469

UNITED STATES PATENT OFFICE 2,008,469

PRODUCTION OF FERTILIZERS

Alfred John Prince, Norton on Tees, England, assignor to Imperial Chemical Industries Limited, a corporation of Great Britain No Drawing. Application September 15, 1932, Serial No. 633,382. In Great Britain September 17, 1931

3 Claims. (Cl. 71—9)

This invention relates to the production of fertilizers in granular form and its principal object is to reduce the tendency of such fertilizers to cake on storage or transport in bulk. As is well known, all the common artificial fertilizers such as ammonium or potassium salts, sodium or calcium nitrate, urea, superphosphate, or mixed fertilizers containing these substances exhibit a tendency to cake when in bulk, and although it is possible to reduce this tendency by manufacturing the fertilizers in granular form, even the granules will cake on prolonged storage or under unfavourable conditions such as alternations of humidity and/or temperature.

It has already been proposed to reduce the caking tendency of fertilizers in general by addition thereto of small quantities of finely divided non-caking substances such as rock phosphate, chalk, or asbestos, but in the case of granular fertilizers such addition gives a product of dusty appearance, and segregation occurs on storage. It has also been proposed to coat granules of fertilizer with soluble glass (alkali silicate) in conjunction with one or more powdered materials such as carbonate, phosphate or sulphate of lime, and instead of alkali silicate, other siliceous binding substances, or binding materials of a resinous, bituminous or pitch-like nature were also proposed for converting a comparatively insoluble or porous inorganic protective material into a film or coating for the granules or particles of an easily soluble fertilizer salt.

I have now found that by adding to a granular fertilizer a small quantity of a powdered non-caking substance, e. g. rock phosphate, calcium carbonate, talc, asbestos or graphite, and agitating the charge for a period of time of at least 15 minutes and varying from about ½–1 hour or more, depending upon the percentage of non-caking substance added and its degree of fineness, the dusty appearance of the product disappears and the non-caking substance forms a smooth coating on the surface of the granules thereby considerably improving their resistance to caking. The disappearance of the dust from the mixture is definitely correlated with the improvement in the resistance to caking of the product as compared with that of the original mixture. The coating may be extremely thin and in no way interferes with the use of the products as fertilizers. In the case of mixed fertilizers where one or more of the constituents is non-caking, this substance or mixture of non-caking substances may be used for coating the granules and if desired the composition of the initial granules may be adjusted so that the final granules have the same composition as those customarily produced without a coating.

According to my invention, therefore, the resistance to caking of granular fertilizers is improved by coating them with a smooth compact layer of a suitable non-caking substance, e. g. rock phosphate, calcium carbonate, talc, asbestos or graphite, by agitating a quantity of granules, which are preferably previously dried as far as possible, with a relatively small quantity of the finely powdered non-caking substance, e. g. 0.5–3 per cent. by weight of the granules. A non-caking substance by definition must be such as not to cake of itself or under conditions of storage, and is therefore quite distinct from the substances usually known as binding agents. The non-caking substance is preferably one having fertilizing properties and in the case of mixed fertilizers where possible it is a constituent thereof. The non-caking substance may also have other valuable properties as regards the use to which the product is to be put, e. g. it may be a basic compound where it is desired to correct the acidity of the soil, or it may have insecticidal or fungicidal properties. The process of my invention is carried out in the absence of binding or agglomerating agents.

It should be observed that the improvement in resistance to caking effected by the invention increases with the quantity of non-caking substance added, but that if more than a certain critical amount is employed, it will not be possible to make it all adhere to the surface of the granules and the dusty appearance of the product will continue to a certain extent. This critical amount increases with the degree of fineness of the non-caking substance, and moreover the more finely divided the non-caking substance the more readily is the smooth coating formed, i. e. the less time is required in the agitation process. Thus in the case of chalk precipitated from cold solutions, up to 12% has been incorporated by the method of my invention on to the surface of granules of the kind treated in the example set out below, and satisfactory results have been obtained with smaller amounts after about 15 minutes treatment, whereas chalk obtained as a by-product in the manufacture of ammonium sulphate from calcium sulphate requires about an hour's treatment, and if more than about 4–5% is employed the granules will retain to a certain extent a dusty appearance. For any given amount of non-caking substance, however, the resistance to caking of the treated product represents a considerable improvement over that of the untreated mixture of granules and non-caking substance.

If desired coloured granules may be produced by the method of my invention by using a coloured non-caking substance such as red iron oxide or by admixing a suitable coloured material such as ultramarine with the non-caking substance.

*Example*

A charge of 200 kg. of dried granules, of average diameter 2 mm. containing 44.5 per cent. ammonium nitrate and 55.5 per cent. calcium carbonate, was mixed with 6 kg. of finely powdered chalk obtained as a by product in the manufacture of ammonium sulphate from calcium sulphate and the mixture was agitated in a drum 1.5 m. in diameter and 1 m. in length, which was rotated at a speed of 15 revolutions per minute. The agitation was continued for one hour, at the end of which time the granules had acquired the desired smooth coating. Storage tests proved that the caking tendency of the product was very much lower than that of the untreated granules.

Similar results were obtained by using 2.0 kg. of finely powdered graphite instead of the 6 kg. of chalk mentioned in the above example.

The treatment may be carried out at the ordinary temperature or at slightly raised temperatures, care being taken that the temperature is not such as materially to soften the granules in the case where they contain easily fusible materials, e. g., certain salts such as calcium nitrate containing water of crystallization.

The invention is particularly applicable to the treatment of granular fertilizers containing ammonium nitrate as these have a certain plasticity which favours the coating process.

As many apparently widely different embodiments of this invention may be made without departing from the spirit and scope thereof, it is to be understood that I do not limit myself to the specific embodiments thereof except as defined in the appended claims.

I claim:—

1. The process of coating apparently dry fertilizer granules of the order of 2 mm. in diameter, which comprises agitating a quantity of said granules with a relatively small amount of a finely powdered non-caking material, and continuing the agitation for a period of at least 15 minutes until the said non-caking material forms a smooth compact coating completely enveloping each granule, care being taken that the temperature of treatment is not such as materially to soften the granules in the case where they contain easily fusible materials.

2. The process of claim 1, in which the non-caking material is selected from the class consisting of rock phosphate, calcium carbonate, talc, asbestos and graphite.

3. The process of rendering fertilizer granules substantially non-caking, which comprises drying the granules, and agitating the dried granules with a relatively small quantity of a finely powdered non-caking material, the agitation being continued for a sufficiently long time to cause the particles of the said non-caking material to become closely packed on the surfaces of the granules, thereby forming a smooth compact coating on each granule, care being taken that the temperature of treatment is not such as materially to soften the granules in the case where they contain easily fusible materials.

ALFRED JOHN PRINCE.